(12) United States Patent
Fuchs et al.

(10) Patent No.: US 11,565,585 B2
(45) Date of Patent: Jan. 31, 2023

(54) VEHICLE TANK

(71) Applicant: MAGNA Energy Storage Systems GesmbH, Sinabelkirchen (AT)

(72) Inventors: Thomas Fuchs, Sinabelkirchen (AT); Laura Heidenbauer, Gleisdorf (AT)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 25 days.

(21) Appl. No.: 17/354,838

(22) Filed: Jun. 22, 2021

(65) Prior Publication Data

US 2022/0105796 A1 Apr. 7, 2022

(30) Foreign Application Priority Data

Oct. 2, 2020 (EP) ..................................... 20199804

(51) Int. Cl.
*B60K 15/03* (2006.01)
*B60R 11/00* (2006.01)

(52) U.S. Cl.
CPC .............. *B60K 15/03* (2013.01); *B60R 11/00* (2013.01); *B60K 2015/0346* (2013.01); *B60K 2015/03243* (2013.01); *B60K 2015/03256* (2013.01); *B60K 2015/03467* (2013.01); *B60R 2011/0003* (2013.01); *B60R 2011/0052* (2013.01); *B60R 2011/0071* (2013.01)

(58) Field of Classification Search
CPC .............. B60K 15/077; B60K 15/0775; B60K 2015/03243; B60K 2015/03256; B60K 2015/03453; B60K 2015/0346; B60K 2015/03467
See application file for complete search history.

(56) References Cited

U.S. PATENT DOCUMENTS 8,973,778 B2 * 3/2015 Ehler ................... B60K 15/067
403/220

FOREIGN PATENT DOCUMENTS

| DE | 4336574 A1 | 5/1995 |
|---|---|---|
| EP | 0087508 A1 | 9/1983 |
| EP | 2730445 A1 | 5/2014 |

* cited by examiner

*Primary Examiner* — Andrew T Kirsch
(74) *Attorney, Agent, or Firm* — Jordan IP Law, LLC; Todd A. Vaughn

(57) ABSTRACT

A motor vehicle tank that includes a tank container formed by a tank wall, and a holding element to fasten a component to the tank wall at an interior of the tank container. The holding element has at least one attachment point for fastening the holding element to the tank wall, at least one fastening element for fastening the component to the holding element, and a plurality of spring elements arranged between the at least one attachment point and the fastening element to facilitate fastening of the component to the tank wall in a spring-elastically decoupled manner.

16 Claims, 1 Drawing Sheet

VEHICLE TANK

CROSS-REFERENCE TO RELATED APPLICATIONS

The present application claims priority under 35 U.S.C. § 119 to European Patent Publication No. EP 20199804.4 (filed on Oct. 2, 2020), which is hereby incorporated by reference in its complete entirety.

TECHNICAL FIELD

Embodiments relates to a motor vehicle tank, comprising a component which is fastened to the tank wall in the interior of the tank container.

BACKGROUND

It is known that built-in parts can be arranged in the interior of tanks of motor vehicles, in particular of fuel tanks, and can be fastened to the container of the tank. For example, fuel pumps for delivering a fuel from the tank or various valves must be fastened in the tank.

The components can be screwed to the tank wall, via holders for example. The holders are usually rigid components which are used for fastening, on the one hand, to the tank wall and, on the other hand, to the component.

Some built-in parts in tanks of motor vehicles can generate unwanted noise during operation of the motor vehicle. Especially in the ever-increasing number of electric and hybrid vehicles, the drives of which can operate with low noise, troublesome noises from the tank system which could be perceived in the interior of the vehicle should be avoided.

Owing, however, to their mechanical operation, some built-in parts almost inevitably generate noises, in particular built-in parts with movable balls, such as roll-over valves (ROV) and pressure-maintaining valves (DHV).

SUMMARY

Embodiments relate to a motor vehicle tank comprising a component which is fastened in the interior of the tank container to facilitate as little as possible emission of noise caused by the component from the motor vehicle tank, and therefore, into the interior of the motor vehicle.

In accordance with embodiments, a motor vehicle tank, comprising a tank container formed by a tank wall, and a component which is fastened to the tank wall in the interior of the tank container via a holding element having at least one attachment point for fastening the holding element to the tank wall, at least one fastening element for fastening the component to the holding element, and a plurality of spring elements between the attachment point and the fastening element to facilitate fastening of the component to the tank wall in a spring-elastically decoupled manner via the holding element.

In accordance with embodiments, a component which can possibly cause undesirable noises is fastened to the tank wall via a holding element. It is not, however, a rigid holding element that is used for fastening but rather an elastic holding element with elastic spring elements between the attachment point at which the holding element is fastened to the tank wall and the component to be fastened. The component is therefore fastened to the tank wall in a spring-elastically decoupled manner, and therefore, the transmission of structure-borne noise to the tank wall and thus out of the tank is reduced.

In accordance with embodiments, the attachment point of the holding element is fastened to the tank wall, and is preferably fastened directly to the tank wall, in particular screwed or welded to the tank wall. The attachment point can be formed, in particular, by a screw bolt.

In accordance with embodiments, the holding element substantially forms a plane, i.e. substantially has no relevant vertical extent. In particular, the spring elements can be formed in the plane and do not extend vertically. As a particular preference, the holding element substantially has the shape of a circle. The attachment point or points can protrude from this plane, thus ensuring that further parts of the holding element do not rest against the tank wall despite the attachment of the attachment points to the tank wall.

In accordance with embodiments, the holding element preferably has at least two attachment points, preferably at least three attachment points. Attachment spring elements, which form spring elements, preferably in each case connect two adjacent attachment points to one another. As a particular preference, these attachment spring elements are of circular-arc-shaped design. Together with the attachment points, the attachment spring elements preferably form the outer circumference of the holding element, in particular in the form of a circle.

In accordance with embodiments, the holding element preferably comprises a surface composed of a soft material as the spring element. In this context, "soft" means that when the component is fastened to the surface, the surface yields significantly due to the weight of the component.

In accordance with embodiments, the surface is preferably connected to other parts of the holding element at least in sections of the outer circumference of said surface.

In accordance with embodiments, as a particular preference, the surface is connected to the attachment spring elements of the holding element at least in sections of the outer circumference of the surface. The surface is therefore held from the outside on the surrounding, likewise elastic, attachment spring elements, preferably in a manner substantially similar to a trampoline. The attachment spring elements preferably form a ring around the surface.

In accordance with embodiments, the surface preferably has stiffening ribs that extend symmetrically or asymmetrically on the surface, i.e., are not distributed in a rotationally symmetrical or mirror-symmetrical manner on the surface. It is thereby possible to enhance the vibration behavior of the surface in order to efficiently reduce noise transmission.

In accordance with embodiments, the fastening element to which the component is fastened is preferably formed on the surface, preferably on an edge of the surface. The fastening element preferably forms a hook or clip. The component can then be hooked or clipped into the fastening element.

In accordance with embodiments, the attachment point or points preferably protrudes/protrude from the plane in a first direction, and the fastening element or elements protrudes/protrude from the plane in the direction opposite to the first direction, in particular also from the surface acting as a spring element.

In accordance with embodiments, the component which is fastened to the holding element can contain a moving part, in particular a ball, with the result that the component produces noises due to the movement of the part, for example, as a result of the ball striking a wall. The component can be a valve, for example, in particular a roll-over valve or a pressure-maintaining valve. The component can also be a pump, for example, in particular a fuel feed pump.

DRAWINGS

Embodiments will be illustrated by way of example in the drawings and explained in the description below.

DESCRIPTION

Figure 2:
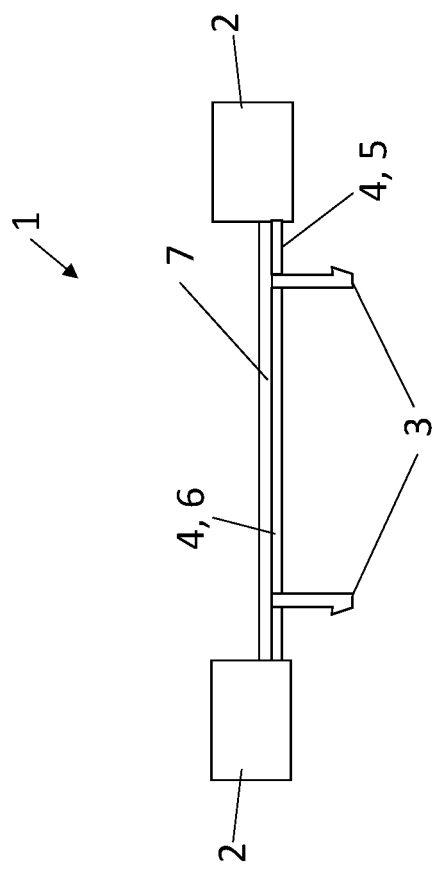
FIG. 2 illustrates a sectional view of the holding element of FIG. 1.
Figure 1:
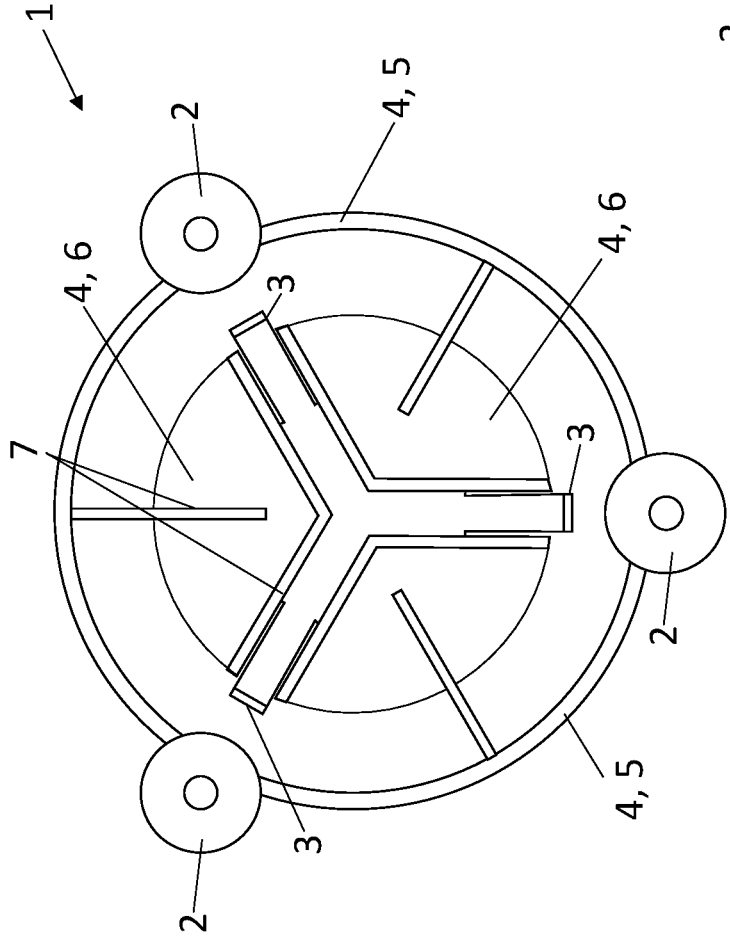
FIG. 1 illustrates a plan view of a holding element of a motor vehicle tank, in accordance with embodiments.

FIGS. 1 and 2 respectively illustrate a holding element of a motor vehicle tank, in accordance with embodiments.

A motor vehicle tank (not illustrated) comprises a tank container formed by a tank wall. A component is fastened to the tank wall in the interior of the tank container via the holding element 1. The holding element 1 substantially forms a plane, namely, a circle. The holding element 1 has three attachment points 2 for fastening the holding element 1 to the tank wall. The attachment points 2 are designed as projecting screw domes.

In an opposite direction to the attachment points 2, a plurality of fastening elements 3 for fastening the component to the holding element 1 project from the plane of the holding element 1 (See, FIG. 2). In a plan view of the plane (See, FIG. 1), the fastening elements 3 are each arranged between the attachment points 2. The fastening elements 3 each form a hook or clip for hooking in the component to be fastened. In each case, two adjacent attachment points 2 are connected to one another by circular-arc-shaped spring elements 4, which are referred to herein as "attachment spring elements" 5. Owing to their thin shape and the material used, the attachment spring elements 5 are formed in such a way that they can yield and have a resilient effect.

A round surface 6 is connected in several sections of its outer circumference to the attachment spring elements 5 of the holding element 1. The surface 6 itself also is composed of a soft material and likewise serves as a spring element 4. The surface 6 has stiffening ribs 7, the stiffening ribs 7 extending symmetrically or asymmetrically on the surface 6 in order to bring about a desired strength and desired resilient properties of the surface 6. The fastening elements 3 are formed on the edge of the surface 6.

A component to be fastened, such as, for example, a roll-over valve, a pressure-maintaining valve or a pump, can be fastened to the fastening elements 3 from below (FIG. 2) and is then below the surface 6, and thus, below the plane of the holding element 1, i.e., on an opposite side of the holding element 1 from the side which is fastened to the tank.

The holding element 1 thus has spring elements 4 between the attachment points 2 and the fastening elements 3, and therefore, the component is fastened to the tank wall in a spring-elastically decoupled manner via the holding element 1, and thus noises are transmitted to a lesser degree from the component to the tank wall and into the motor vehicle.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS 1 holding element
2 attachment point
3 fastening element
4 spring element
5 attachment spring element
6 surface
7 stiffening rib

What is claimed is:

1. A motor vehicle tank, comprising:
a tank container formed by a tank wall; and
an elastic holding element, substantially forming a circular-shaped plane, to fasten a component to the tank wall at an interior of the tank container, the elastic holding element having:
at least one attachment point for fastening the elastic holding element to the tank wall,
at least one fastening element for fastening the component to the elastic holding element, and
a plurality of spring elements, having a circular-arc shape, arranged between the at least one attachment point and the fastening element to facilitate attachment of adjacent attachment points to one another and also fastening of the component to the tank wall in a spring-elastically decoupled manner, wherein the elastic holding element has a surface composed of a soft material to serve as the spring elements.

2. The motor vehicle tank of claim 1, wherein the at least one attachment point is fastened directly to the tank wall via a mechanical screw attachment.

3. The motor vehicle tank of claim 1, wherein the at least one attachment point is fastened directly to the tank wall via a weld attachment.

4. The motor vehicle tank of claim 1, wherein, at least in sections of an outer circumference of the surface of the elastic holding element, the surface is connected to the other parts of the elastic holding element.

5. The motor vehicle tank of claim 1, wherein the elastic holding element surface comprises a plurality of stiffening ribs that extend symmetrically or asymmetrically thereon.

6. The motor vehicle tank of claim 1, wherein the fastening element is formed on an edge of the elastic holding element surface.

7. The motor vehicle tank of claim 1, wherein the fastening element forms a hook or clip.

8. The motor vehicle tank of claim 1, wherein the component is a valve or a pump.

9. A motor vehicle tank, comprising:
a tank container formed by a tank wall; and
an elastic holding element, substantially forming a circular-shaped plane, to fasten a component to the tank wall at an interior of the tank container, the elastic holding element having:
at least two attachment points for fastening the elastic holding element to the tank wall,
at least one fastening element for fastening the component to the elastic holding element, and
a plurality of attachment spring elements, having a circular-arc-shape, arranged between the at least one attachment point and the fastening element to facilitate attachment of adjacent attachment points to one another and also fastening of the component to the tank wall in a spring-elastically decoupled manner, wherein the elastic holding element has a surface composed of a soft material to serve as the attachment spring elements.

10. The motor vehicle tank of claim 9, wherein, at least in sections of the outer circumference of the surface of the elastic holding element, the surface is connected to the attachment spring elements.

11. The motor vehicle tank of claim 9, wherein the elastic holding element surface comprises a plurality of stiffening ribs that extend symmetrically or asymmetrically thereon.

12. The motor vehicle tank of claim 9, wherein the fastening element is formed on an edge of the surface of the holding element.

13. A motor vehicle tank, comprising:
   a tank container formed by a tank wall; and
   an elastic holding element, substantially forming a circular-shaped plane, to fasten a component to the tank wall at an interior of the tank container, the elastic holding element having:
      at least three attachment points for fastening the elastic holding element to the tank wall,
      at least one fastening element for fastening the component to the elastic holding element, and
      a plurality of attachment spring elements, having a circular-arc-shape, arranged between the at least one attachment point and the fastening element to facilitate attachment of adjacent attachment points to one another and also fastening of the component to the tank wall in a spring-elastically decoupled manner,
   wherein the elastic holding element has a surface composed of a soft material to serve as the attachment spring elements.

14. The motor vehicle tank of claim 13, wherein, at least in sections of the outer circumference of the surface of the elastic holding element, the surface is connected to the attachment spring elements.

15. The motor vehicle tank of claim 13, wherein the surface of the elastic holding element comprises a plurality of stiffening ribs that extend symmetrically or asymmetrically thereon.

16. The motor vehicle tank of claim 13, wherein the fastening element is formed on an edge of the surface of the elastic holding element.

* * * * *